United States Patent
Aberg et al.

(10) Patent No.: US 8,758,569 B2
(45) Date of Patent: *Jun. 24, 2014

(54) PERMEABLE BELT FOR NONWOVENS PRODUCTION

(75) Inventors: Bo-Christer Aberg, Halmstad (SE); Cary P. Johnson, Clifton Park, NY (US); Francis L. Davenport, Ballston Lake, NY (US); Pierre Riviere, Bas-rhin (FR); John J. Lafond, Appleton, WI (US); Jonas Karlsson, Falkenberg (SE); Jean-Louis Monnerie, Saint-Junien (FR)

(73) Assignee: Albany International Corp., Albany, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/063,695

(22) PCT Filed: Sep. 2, 2009

(86) PCT No.: PCT/US2009/055751
§ 371 (c)(1),
(2), (4) Date: Jul. 22, 2011

(87) PCT Pub. No.: WO2010/030547
PCT Pub. Date: Mar. 18, 2010

(65) Prior Publication Data
US 2011/0272112 A1    Nov. 10, 2011

Related U.S. Application Data

(60) Provisional application No. 61/096,149, filed on Sep. 11, 2008.

(51) Int. Cl.
*D21F 1/10* (2006.01)
*B32B 3/24* (2006.01)
*B23B 3/30* (2006.01)
*D04H 1/70* (2012.01)
*D04H 5/08* (2012.01)

(52) U.S. Cl.
USPC ........... 162/296; 162/115; 162/116; 162/348; 162/903; 428/131

(58) Field of Classification Search
CPC ... D21F 1/0027; D21F 1/0036; D21F 1/0063; D21F 11/006; D21F 1/008; D21F 1/009; D04H 1/22; D04H 1/732; D04H 1/736; D04H 1/72; D04H 5/08; D04H 1/70; D04H 1/74; D04H 1/465; D04H 1/492; B32B 3/00; B32B 3/14; B32B 3/16; B32B 3/26; B32B 3/263; B32B 3/266; B32B 3/30
USPC ......... 162/116, 296, 362, 348, 900–904, 115; 28/104–106; 428/131; 264/86, 87, 284; 425/80.1, 83.1, 84, 85

See application file for complete search history.

(56) References Cited

U.S. PATENT DOCUMENTS 2,862,251 A    12/1958 Kalwaites
3,121,660 A    2/1961 Hall, Jr.

(Continued)

FOREIGN PATENT DOCUMENTS

DE    25 38 691 A    3/1977
DE    3444082 A    8/1986

(Continued)

OTHER PUBLICATIONS

International Search Report and Written Opinion from EPO for PCT/US2008/076647.

(Continued)

*Primary Examiner* — Eric Hug
(74) *Attorney, Agent, or Firm* — Frommer Lawrence & Haug LLP; Ronald R Santucci

(57) ABSTRACT

A fabric structure used to make textured nonwoven products, the structure being permeable to air and water, comprising a web contact surface having a pattern including a series of raised land areas and corresponding depressions adapted to impart a texture to the nonwoven product produced thereon, and a series of through voids adapted to allow passage of both water and/or air from the fabric surface into and/or through the structure.

90 Claims, 12 Drawing Sheets

(56) References Cited

U.S. PATENT DOCUMENTS

| | | |
|---|---|---|
| 3,214,819 A | 11/1965 | Guerin |
| 3,323,226 A | 6/1967 | Beaumont et al. |
| 3,399,111 A | 8/1968 | Beaumont et al. |
| 3,485,706 A | 12/1969 | Evans |
| 3,508,308 A | 4/1970 | Bunting, Jr. et al. |
| 4,085,485 A | 4/1978 | Brandon et al. |
| 4,206,258 A | 6/1980 | Balcar |
| 4,446,187 A | 5/1984 | Eklund |
| 4,537,658 A | 8/1985 | Albert |
| 4,541,895 A | 9/1985 | Albert |
| 4,849,054 A | 7/1989 | Klowak |
| 5,098,764 A | 3/1992 | Drelich et al. |
| 5,208,087 A | 5/1993 | Stigberg |
| 5,244,711 A | 9/1993 | Drelich et al. |
| 5,245,025 A | 9/1993 | Trokhan et al. |
| 5,281,461 A | 1/1994 | Greenway et al. |
| 5,298,124 A | 3/1994 | Eklund et al. |
| 5,336,373 A | 8/1994 | Scattolino et al. |
| 5,393,384 A | 2/1995 | Steiner et al. |
| 5,445,746 A | 8/1995 | Lee |
| 5,549,193 A | 8/1996 | Schlueter, Jr. et al. |
| 5,575,874 A * | 11/1996 | Griesbach et al. ............ 156/167 |
| 5,679,222 A | 10/1997 | Rasch et al. |
| 2,730,246 A | 2/1998 | Vuillaume |
| 5,713,399 A | 2/1998 | Collette et al. |
| 5,730,817 A | 3/1998 | Feygin et al. |
| 2,734,285 A | 6/1998 | Noelle |
| 5,776,307 A * | 7/1998 | Ampulski et al. ............ 162/117 |
| 5,814,349 A | 9/1998 | Geus et al. |
| 5,827,597 A | 10/1998 | James et al. |
| 5,837,102 A | 11/1998 | Graf |
| 5,900,122 A | 5/1999 | Huston |
| 5,906,786 A | 5/1999 | James et al. |
| 5,916,462 A | 6/1999 | James et al. |
| 5,972,813 A | 10/1999 | Polat et al. |
| 6,010,598 A | 1/2000 | Boutilier et al. |
| 6,120,642 A | 9/2000 | Lindsay et al. |
| 6,124,015 A | 9/2000 | Baker et al. |
| 6,159,880 A | 12/2000 | Schiel |
| 6,171,447 B1 | 1/2001 | Trokhan |
| 6,274,042 B1 | 8/2001 | Beck |
| 6,290,818 B1 | 9/2001 | Romanski |
| 6,331,341 B1 | 12/2001 | Joyce |
| 6,340,413 B1 | 1/2002 | Nilsson et al. |
| 6,358,594 B1 | 3/2002 | Ampulski |
| 6,436,240 B1 | 8/2002 | Jeffrey |
| 6,461,474 B1 | 10/2002 | Lindsay et al. |
| 6,547,924 B2 | 4/2003 | Klerelid et al. |
| 6,610,173 B1 | 8/2003 | Lindsay et al. |
| 6,616,812 B2 | 9/2003 | Beck |
| 6,616,814 B2 | 9/2003 | Best |
| 6,630,223 B2 | 10/2003 | Hansen |
| 6,660,362 B1 | 12/2003 | Lindsay et al. |
| 6,712,940 B2 | 3/2004 | Crook |
| 6,723,208 B1 | 4/2004 | Hansen |
| 6,743,339 B1 | 6/2004 | Nilsson et al. |
| 6,743,571 B1 * | 6/2004 | Hill et al. ............ 430/306 |
| 6,780,282 B2 | 8/2004 | Scherb et al. |
| 6,865,784 B2 | 3/2005 | Noelle |
| 6,875,315 B2 | 4/2005 | Bakken et al. |
| 6,878,238 B2 | 4/2005 | Bakken et al. |
| 6,998,017 B2 | 2/2006 | Lindsay et al. |
| 7,005,044 B2 | 2/2006 | Kramer et al. |
| 7,008,513 B2 | 3/2006 | Davenport et al. |
| 7,014,735 B2 | 3/2006 | Kramer et al. |
| 7,022,208 B2 | 4/2006 | Davenport et al. |
| 7,128,809 B2 | 10/2006 | Viinson et al. |
| 7,128,810 B2 | 10/2006 | Hansen |
| 7,141,142 B2 | 11/2006 | Burazin et al. |
| 7,144,479 B2 | 12/2006 | Davis et al. |
| 7,166,196 B1 | 1/2007 | Kramer et al. |
| 7,169,265 B1 | 1/2007 | Kramer et al. |
| 7,294,237 B2 | 11/2007 | Herman et al. |
| 7,294,238 B2 | 11/2007 | Bakken et al. |
| 7,297,233 B2 | 11/2007 | Herman et al. |
| 7,410,554 B2 | 8/2008 | Davenport |
| 7,491,297 B2 | 2/2009 | Serr et al. |
| 7,494,571 B2 | 2/2009 | Takamura |
| 7,501,044 B2 | 3/2009 | Hikida et al. |
| 7,504,060 B2 | 3/2009 | Brock et al. |
| 7,524,403 B2 | 4/2009 | Fernandes et al. |
| 7,527,709 B2 | 5/2009 | Lippi Alves Fernandes et al. |
| 7,540,942 B2 | 6/2009 | Hikita |
| 7,550,061 B2 | 6/2009 | Walkenhaus et al. |
| 2003/0087575 A1 | 5/2003 | Carlson et al. |
| 2003/0145444 A1 | 8/2003 | Schmitz |
| 2004/0069432 A1 | 4/2004 | Hansen |
| 2004/0116031 A1 | 6/2004 | Brennan et al. |
| 2004/0118545 A1 | 6/2004 | Bakken et al. |
| 2004/0118546 A1 | 6/2004 | Bakken et al. |
| 2005/0167062 A1 | 8/2005 | Herman et al. |
| 2007/0134467 A1 | 6/2007 | Sayers |
| 2007/0167099 A1 | 7/2007 | Patel et al. |
| 2007/0246119 A1 | 10/2007 | Herman |

FOREIGN PATENT DOCUMENTS

| | | |
|---|---|---|
| DE | 19548747 A | 7/1997 |
| EP | 0 037 387 A | 10/1981 |
| EP | 0 103 376 A | 7/1983 |
| EP | 0 147 904 A | 7/1985 |
| EP | 0 337 451 A | 10/1989 |
| EP | 0 446 432 A | 9/1991 |
| EP | 0 705 933 A | 4/1996 |
| EP | 0 972 876 A2 | 1/2000 |
| EP | 1 040 223 B | 2/2003 |
| EP | 0 868 251 B | 11/2004 |
| EP | 1 566 259 A | 8/2005 |
| EP | 1 339 915 B | 7/2007 |
| FR | 1 460 513 A | 10/1966 |
| FR | 2710246 A | 8/1996 |
| FR | 2734285 A | 11/1996 |
| GB | 995620 | 6/1965 |
| GB | 1025000 | 4/1966 |
| GB | 1037003 | 7/1966 |
| GB | 1 393 426 | 5/1975 |
| GB | 1515455 | 6/1978 |
| JP | 61-020686 | 1/1986 |
| JP | 06-170959 | 6/1994 |
| JP | 2001-288671 A | 10/2001 |
| JP | 2004-169235 A | 6/2004 |
| WO | WO 86/05219 A | 9/1986 |
| WO | WO 95/21285 A | 8/1995 |
| WO | WO 98/00605 A | 1/1998 |
| WO | WO 98/01618 A | 1/1998 |
| WO | WO 99/10597 A | 3/1999 |
| WO | WO 02/40769 A | 5/2002 |
| WO | WO 02/41815 A | 5/2002 |
| WO | WO 2004/038093 A | 5/2004 |
| WO | WO 2005/042836 A | 5/2005 |
| WO | WO 2005/087997 A | 9/2005 |
| WO | WO 2005/116332 A | 12/2005 |
| WO | WO 2008/006870 A | 1/2008 |
| WO | WO 2010/030298 A | 3/2010 |
| WO | WO-2010/030570 A | 3/2010 |
| WO | WO-2010/068765 | 6/2010 |

OTHER PUBLICATIONS

International Search Report and Written Opinion from EPO for PCT/US2009/056007.
International Search Report and Written Opinion from EPO for PCT/US2009/055751.
International Search Report and Written Opinion for PCT/US2010/022247.

* cited by examiner

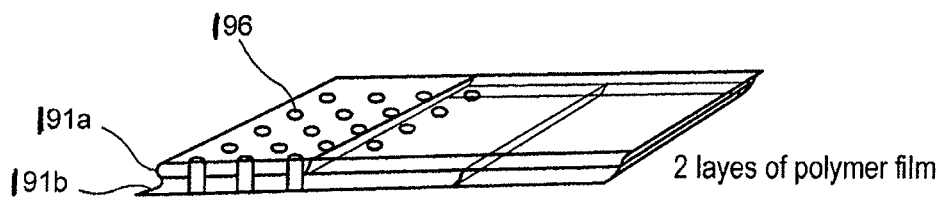
FIG. 11A
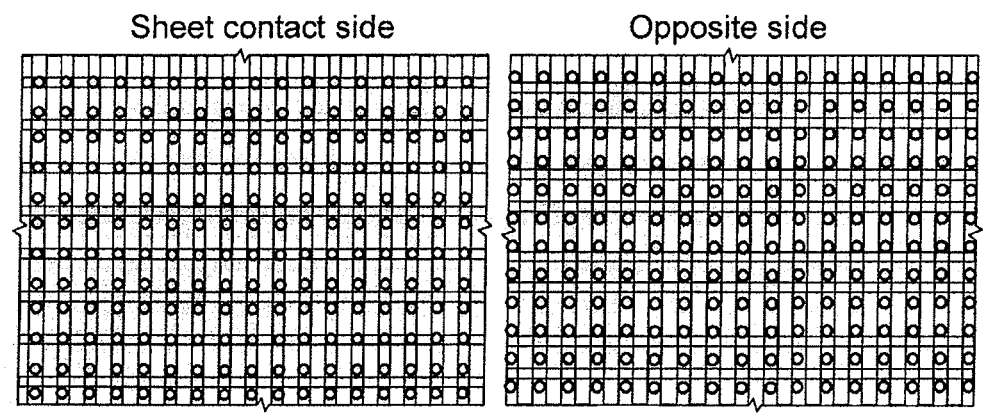
FIG. 11B         FIG. 11C
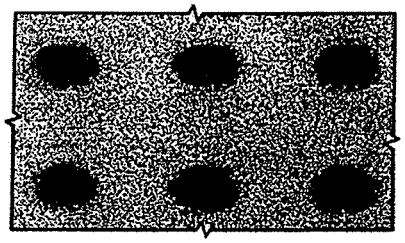    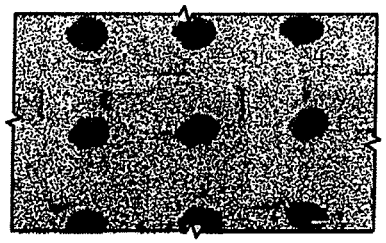
SEM picture of sheet contact side      SEM picture of oposite side
FIG. 11D         FIG. 11E

PERMEABLE BELT FOR NONWOVENS PRODUCTION

CROSS-REFERENCE TO RELATED APPLICATION

This application claims priority benefits of U.S. Provisional Patent Application Ser. No. 61/096,149 filed Sep. 11, 2008.

BACKGROUND OF THE INVENTION

1. Field of the Invention

The present invention relates to endless structures, in belt or sleeve form, for use in the production of nonwoven products, and more particularly, the instant invention is directed to support members such as belts or sleeves used in the production of patterned, marked, structured or textured nonwoven products.

2. Description of Related Art

The production of nonwoven products is well known in the art. Such products are produced directly from fibers without conventional textile methods such as weaving or knitting operations. Instead, they may be produced by nonwoven manufacturing methods such as airlaid, drylaid, and carding, or some combination of these processes in which fibers are laid down to form an integral nonwoven web.

Nonwoven product may also be produced by airlaying, or carding operations where the web of fibers is consolidated or processed, subsequent to deposition, into a nonwoven product by needling or spunlacing (hydroentanglement.) In the latter, high-pressure water jets are directed vertically down onto the web to entangle the fibers with each other. This process will be discussed in more detail in later parts of this section. In needling, the entanglement is achieved mechanically through the use of a reciprocating bed of barbed needles which force fibers on the surface of the web further thereinto during the entry stroke of the needles.

There presently exists an apparatus for the production of nonwovens, for example, spunbond webs, structures or articles formed from filaments or fibers typically made from a thermoplastic rein. Such an apparatus is disclosed in U.S. Pat. No. 5,814,349, the disclosure of which is incorporated herein by reference. Such apparatuses typically include a spinneret for producing a curtain of strands and a process-air blower for blowing process air onto the curtain of strands for cooling the same to form thermoplastic filaments. The thermoplastic filaments are then typically aerodynamically entrained by the process air for aerodynamic stretching of the thermoplastic filaments, which are then after passing through a diffuser deposited upon a continuously circulating belt or screen (permeable fabric) for collecting the interentangled filaments and forming a web thereon. The web, structure or article, so formed, is then transferred and subject to further processing.

In the meltblown process for manufacturing nonwoven materials, thermoplastic polymer is placed in an extruder and is then passed through a linear die containing about twenty to forty small orifices per inch of die width. Convergent streams of hot air rapidly attenuate the extruded polymer steams to form solidifying filaments. The solidifying filaments are subsequently blown by high velocity air onto a take-up screen or another layer of woven or nonwoven material thus forming a meltblown web.

The spunbonding and meltblowing process can be combined in applications such as spunbound-meltblown-spunbound ("SMS"). In SMS a first layer of spunbonded material is formed on a belt or conveyor. The belt typically has a uniform surface pattern and air permeability to attain the right web formation during the spunbond process. The spunbonded material is deposited on the belt at the lay down forming area to form the web in a first spunbond beam.

A pressure nip, or systems such as utilizing a hot air knife can help to enhance pre-bonding pressure and/or temperature acting on the web. In order to assist in drawing the thermoplastic fibers onto the forming belt, a vacuum box is located beneath the belt and which applies suction to the belt. The airflow needed for the spunbond process is supplied to the system by a vacuum box connected to the appropriately sized vacuum pump.

An airlaid process may also be used to form a nonwoven web. The airlaid process begins with a defibrillation system to open fluff pulp. A conventional fiberizer or other shredding device may also be used to form discrete fibers. Particles of absorbent materials (for example super absorbent powder), abrasives, or other materials may then be mixed with the fibers. The mixture is then suspended in an air stream within a forming system and deposited to a moving forming belt or rotating perforated cylinder onto the circumference of which can be a metallic or polymer sleeve. The randomly oriented airformed fiber may then be bonded by applying a latex binder and drying or thermally bonding.

In general, processes for making nonwoven products have been known for many years. In one process, subsequent to deposition, a fiber batt or web is treated with water streams or jets to cause the fibers to entangle with each other and improve the physical properties, such as strength, of the web. Such techniques for treatment by means of water jets have been known for decades, as may be gathered from the disclosures of U.S. Pat. Nos. 3,214,819, 3,508,308 and 3,485,706.

In general terms, this method involves interlacing of elementary fibers with one another by means of the action of water jets under pressure, which act on the fibrous structure like needles and make it possible to reorient part of the fibers forming the web in the thickness direction.

Such technology has been widely developed at the present time and is used not only for producing what are known as "spunlaced" or "hydro entangled" structures for textile use, such as, in particular for applications in medical fields and hospitals, for wiping, filtration and wrappings for teabags, but also for making tiny perforations in continuous media such as paper, cardboard, films, even sheets of plastic or the like and the articles obtained may be regular and homogeneous, as may be gathered from the disclosure of U.S. Pat. No. 3,508, 308, and if required, comprise designs resulting from the reorientation of the fibers, this being essential for an esthetic purpose, as may be gathered from the disclosure of U.S. Pat. No. 3,485,706.

As to products of the "spunlace" or "hydroentangled" type, it has been known for a very long time that the final properties of the product can be adapted by producing mixtures of material, for example by combining a plurality of webs consisting of fibers of different types, for example of natural, artificial or synthetic fibers, or even webs in which the fibers are previously mixed (webs of the "spunbond" type, etc.) with reinforcements that can be incorporated into the nonwoven structure.

French patents FR-A-2 730 246 and 2 734 285, corresponding respectively to U.S. Pat. No. 5,718,022 and U.S. Pat. No. 5,768,756, describe solutions which make it possible to successfully treat hydrophobic fibers or mixtures of these fibers with other hydrophilic fibers or even webs consisting entirely of natural fibers by means of water jets.

In general terms, according to the teachings of these documents, the treatment involves treating a basic web composed of elementary fibers of the same type or of different types, compressing and moistening this basic web and then intermingling the fibers by means of at least one rack of contiguous jets of water under high pressure acting on the basic web.

For this purpose, the basic web is advanced positively on an endless porous support in motion, and it is brought onto the surface of a perforated rotary cylindrical drum, to the interior of which a partial vacuum is applied. The basic web is compressed mechanically between the porous support and the rotary drum which both advance substantially at the same speed. Immediately downstream of the compression zone, a water curtain is directed onto the web and passes successively through the porous support, the compressed basic web and the supporting perforated drum which sucks up the excess water.

The elementary fibers are intermingled continuously, still on the rotary cylindrical drum, by the compressed and wetted web being subjected to the action of at least one rack of jets of water under high pressure. In general, bonding is carried out by means of a plurality of successive racks of water jets which act either on the same face or alternately against the two faces of the web, the pressure within the racks and the velocity of the jets discharged varying from one rack to the next and usually progressively.

It is important to note, as may be gathered from FR 2 734 285, that the perforated roller may comprise randomly distributed micro-perforations. If required, after the initial bonding treatment, the fibrous nonwoven structure may be subjected to a second treatment applied to the reverse face.

In the process of producing spunlaced or hydroentangled nonwoven products, it is desired to impart a pattern or mark on the finished product, thereby creating a desired design on the product. This pattern or mark is typically developed using a secondary process, separate from the nonwoven sheet forming and roll-up process, where a calendar roll is used. These rolls are typically expensive and operate on the principle of compressing certain areas of the fibrous web to create the required patterns or marks. However, there are several drawbacks of using a separate process for creating the pattern or mark on the nonwoven product. For starters, a high initial investment for calendar rolls would be required, which can limit the size of runs that can be economically justified by a producer. Second, higher processing costs would be incurred due to a separate patterning or marking stage. Third, the final product would have a higher than required material content to maintain product caliper after compression in the calendaring step. Lastly, the two-stage process would lead to a low bulk in the finished product due to high pressure compression during calendaring. Prior art nonwoven products made with these known patterning processes do not have clear, well defined raised portions and therefore the desired patterns are difficult to see. In addition, the raised portions of prior art embossed nonwoven products are not dimensionally stable and their raised portions lose their three-dimensional structure when stressed, as for example, when they are handled or laundered.

U.S. Pat. Nos. 5,098,764 and 5,244,711 disclose the use of a support member in a more recent method of producing nonwoven webs or products. The support members have a topographical feature configuration as well as an array of apertures. In this process, a starting web of fiber is positioned on the topographical support member. The support member with the fibrous web thereon is passed under jets of high pressure fluid, typically water. The jets of water cause the fiber to intertwine and entangle with each other in a particular pattern, based on the topographical configuration of the support member.

The pattern of topographical features and apertures in the support member is critical to the structure of the resulting nonwoven product. In addition, the support member must have sufficient structural integrity and strength to support a fibrous web while fluid jets rearrange the fibers and entangle them in their new arrangement to provide a stable fabric. The support member must not under go any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. In addition, the support member should be substantially free of burrs, hooks or the like irregularities that could interfere with the removal therefrom of the entangled fabric. At the same time, the support member must be such that fibers of the fibrous web being processed thereon are not washed away under the influence of the fluid jets.

One of the main problems which arises during the production of nonwoven products is that of achieving the cohesion of the structure in order to give the products mechanical characteristics according to the application in question, while maintaining or imparting particular physical characteristics, such as bulk, handle, appearance, etc.

The properties of bulk, absorbency, strength, softness, and aesthetic appearance are indeed important for many products when used for their intended purpose. To produce a nonwoven product having these characteristics, a fabric will often be constructed such that the sheet contact surface exhibits topographical variations.

It should be appreciated that these fabrics may take the form of endless loops and function in the manner of conveyors, or as a sleeve mounted on a cylinder. It should further be appreciated that nonwoven production is a continuous process which proceeds at considerable speeds. That is to say, the elementary fibers are continuously deposited onto the forming fabric in the forming section, while a newly manufactured nonwoven web is continuously wound onto rolls after it is dried.

SUMMARY OF THE INVENTION

The instant invention provides an improved belt or sleeve that functions in place of a traditional belt or sleeve, and imparts desired physical characteristics, such as bulk, appearance, texture, absorbency, strength, and handle to the nonwoven products produced thereon.

Disclosed is a belt or sleeve used to make textured nonwoven products, the structure being permeable to both air and/or water.

Further, the structure has a web contact surface pattern of a series of raised land areas and corresponding depressions that impart a texture to the nonwoven product produced thereon.

Another aspect of the disclosure is the structure has voids such as through holes to allow the passage of either or both of water or air.

Another aspect of the disclosure is that the voids are in the structure in a certain desired pattern.

It is therefore a principal object of the invention to provide a spunlacing or hydroentangling support member such as a belt or sleeve that has a topography of through voids in a desired pattern.

In one embodiment, a fabric structure is disclosed that is used to make textured nonwoven products, the structure being permeable to air and water, comprising the sheet contact surface having a pattern including a series of raised land areas and corresponding depressions adapted to impart a texture to the nonwoven product produced thereon, and a series of through voids adapted to allow passage of both water and air from the fabric surface into the surface, the voids being greater than 50 microns in effective diameter.

The disclosed fabric structures provide for, amongst other things, enhanced dewatering as compared to an impermeable belt or sleeve. Further, the holes actually can aid texturing of the end product (nonwoven) as compared to a smooth plain impermeable belt or sleeve.

For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 8D shows a void (through hole) in land areas.

FIGS. 11A-9G show fabric structures configured as a conveyor usable in a nonwovens manufacturing process.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the illustrated embodiments set forth herein. Rather, these illustrated embodiments are provided so that this disclosure will be thorough and complete, and will convey the scope of the invention to those skilled in the art.

While the term fabric and fabric structure is used, fabric, belt, conveyor, sleeve, support member, and fabric structure are used interchangeably to describe the structures of the present invention.

Figure 1:
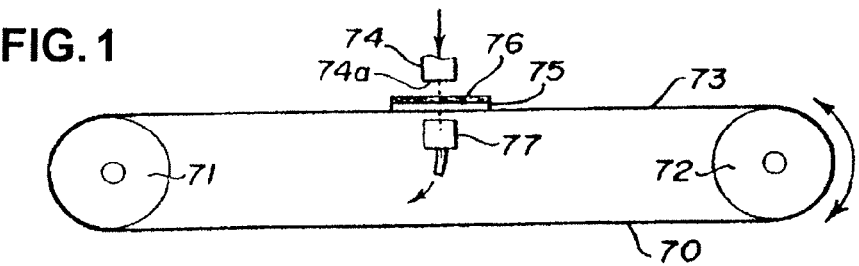
FIGS. 1, 2 and 3 are schematic views of three types of apparatus for producing nonwoven webs using the support member, belt or sleeve, of the present invention.

The present invention provides a continuous support member, such as a belt, for use in the apparatus shown in FIG. 1, for example. The nonwoven support member functions in place of a traditional woven support member, and imparts desired texture, hand, and bulk to the nonwoven products produced thereon.

FIG. 1 is a schematic representation of one type of apparatus for producing nonwoven products using support members of the present invention. In this apparatus, a foraminous conveyor belt 70 moves continuously about two spaced apart rotatable rolls 71 and 72. The belt is driven so that it can be reciprocated or moved in either a clockwise or counterclockwise direction. A water ejecting manifold 74 is placed above the upper reach 73 of belt 70. This manifold has a plurality of very fine diameter holes or orifices. The diameter of the orifices is about 0.007 inch and there are about 30 such holes per lineal inch. Water is supplied to manifold 74 under pressure and is ejected from the orifices in the form of substantially columnar, non-diverging jets or streams. A topographical support member 75 is placed on top of belt 70 and a web 76 of fibers is placed on top of the topographical support member. A suction manifold 77 is placed directly beneath water manifold 74, but under upper reach 73 of belt 70. This suction manifold aids in removing the water ejected from manifold 74 so as to prevent flooding of fibrous web 76. Water delivered to the manifold at a predetermined pressure is ejected from the orifices of the manifold in the form of substantially columnar streams or jets and impinges on the upper surface of fibrous web 76. The distance from the lower surface 74a of manifold 74 to the upper surface of web 76 to be processed is sufficiently small so as to insure that the water jets which issue from the orifices of manifold 74 contact the upper surface of fibrous web 76 in the aforementioned substantially columnar, non-diverging form. This distance may vary but typically is about 0.75 inch. The water jets pass through the fibrous web, then through drain holes provided in the topographical support member. Spent processing water is removed through the suction manifold.

Figure 2:
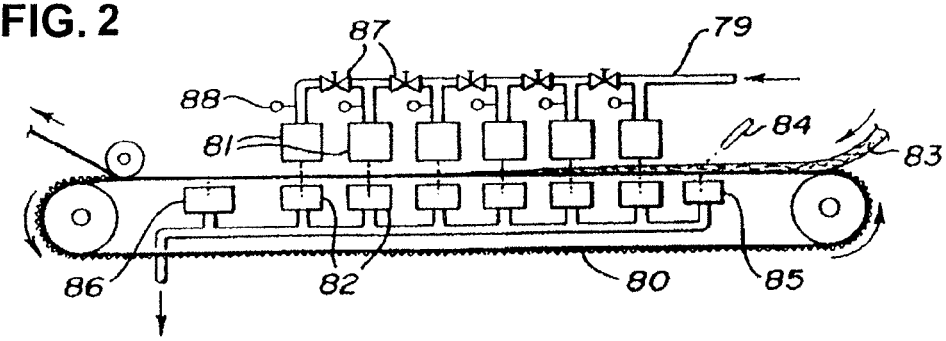

FIG. 2 depicts an apparatus for continuously producing nonwoven products using a support member in accordance with the present invention. The apparatus of FIG. 2 includes a conveyor belt 80 which actually serves as the topographical support member in accordance with the present invention. The belt is continuously moved in a counterclockwise direction about a pair of spaced-apart rollers as is well known in the art. Disposed above belt 80 is a fluid ejecting manifold 79 connecting a plurality of lines or groups 81 of orifices. Each group has one or more rows of very fine diameter orifices, each about 0.007 inch in diameter with 30 such orifices per inch. Water is supplied to the groups 81 of orifices under a predetermined pressure and is ejected from the orifices in the form of very fine, substantially columnar, non-diverging streams or jets of water. The manifold is equipped with pressure gauges 88 and control valves 87 for regulating the fluid pressure in each line or group of orifices. Disposed beneath each orifice line or group is a suction box 82 for removing excess water, and to keep the area from undue flooding. The fiber web 83 to be formed into the fabric of the present invention is fed to the topographical support member conveyor belt. Water is sprayed through an appropriate nozzle 84 onto the fibrous web to pre-wet the incoming web 83 and aid in controlling the fibers as they pass under the fluid ejecting manifolds. A suction slot 85 is placed beneath this water nozzle to remove excess water. Fibrous web passes under the fluid ejecting manifold in a counter clockwise direction. The pressure at which any given group 81 of orifices is operated can be set independently from the pressure at which any of the other groups 81 of orifices is operated. Typically, however, the group 81 of orifices nearest spray nozzle 84 is operated at a relatively low pressure, e.g. 100 psi. This assists in settling the incoming web onto the surface of the support member. As the web passes in the counterclockwise direction in FIG. 2, the pressures at which the groups 81 of orifices are operated is usually increased. It is not necessary that each succeeding group 81 of orifices be operated at a pressure higher than its neighbor in the clockwise direction. For example, two or more adjacent groups 81 of orifices could be operated at the same pressure, after which the next succeeding group 81 of orifices (in the counterclockwise direction) could be operated at a different pressure. Very typically, the operating pressures at the end of the conveyor belt where the web is removed are higher than the operating pressures where the web is initially fed into the conveyor belt. Though six groups 81 of orifices are shown in FIG. 2, this number is not critical, but will depend on the weight of the web, the speed, the pressures used, the number of rows of holes in each group, etc. After passing between the fluid ejecting manifold and the suction manifolds, the now formed nonwoven product is passed over an additional suction slot 86 to remove excess water. The distance from the lower surfaces of the groups 81 of orifices to the upper surface of fibrous web 83 typically ranges from about 0.5 inch to about 2.0 inches; a range of about 0.75 inch to about 1.0 inch is preferred. It will be apparent that the web cannot be spaced so closely to the manifold that the web contacts the manifold. On the other hand, if the distance between the lower surfaces of the orifices and the upper surface of the web is too great, the fluid streams will lose energy and the process will be less efficient.

Figure 3:
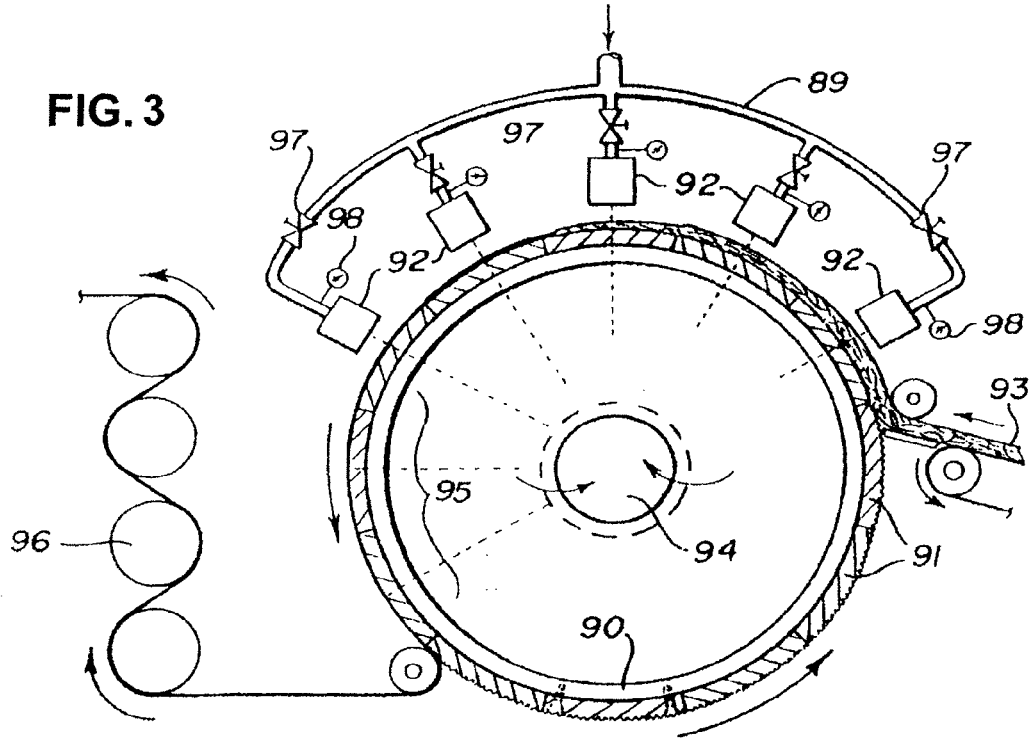

Another apparatus for producing nonwoven products using support members of the present invention is schematically depicted in FIG. 3. In this apparatus, the topographical support member is a rotatable drum sleeve 90. The drum under the drum sleeve 90 rotates in a counterclockwise direction. The outer surface of the drum sleeve 90 comprises the desired topographical support configuration. Disposed about a portion of the periphery of the drum is a manifold 89 connecting a plurality of orifice strips 92 for applying water or other fluid to a fibrous web 93 placed on the outside surface of the curved plates. Each orifice strip may comprise one or more rows of very fine diameter holes or apertures of the type mentioned earlier herein. Typically, the apertures are approximately $5/1000$ of an inch to $10/1000$ of an inch in diameter. There may be as many as 50 or 60 holes per inch or more if desired. Water or other fluid is directed through the rows of orifices. In general, and as explained above, the pressure in each orifice group is typically increased from the first group under which the fibrous web passes to the last group. The pressure is controlled by appropriate control valves 97 and is monitored by pressure gauges 98. The drum is connected to a sump 94 on which a vacuum may be pulled to aid in removing water and to keep the area from flooding. In operation, the fibrous web 93 is placed on the upper surface of the topographical support member before the water ejecting manifold 89 as seen in FIG. 3. The fibrous web passes underneath the orifice strips and is formed into a nonwoven product in accordance with the present invention. The formed nonwoven product is then passed over a section 95 of the apparatus 95 where there are no orifice strips, but vacuum is continued to be applied. The nonwoven product after being de-watered is removed from the drum and passed around a series of drying cans 96 to dry the nonwoven product.

Turning now to the structure of the support members, the support members may have a topography of through voids. The through voids may include, among other things, geometrical characteristics that provide enhanced web topography and bulk to the nonwoven products or sheets/web when produced, for example, on support member. Another advantage of the instant support members is easier web release from support member to the dryer cylinder. Yet another advantage is that it avoids the constraints of and need for a conventional weaving loom since the through voids can be placed in any desired location pattern and thus the aesthetics of the sheet/web appearance may be improved.

In addition, support members constructed in accordance with the instant invention will result in deeper pockets resulting in a nonwoven web with higher bulk, absorbency and lower density. It will be appreciated that the term "through void" is synonymous to the term "through hole" and represents any opening that passes entirely through a support member such as a belt or sleeve. A support member as referred to herein includes, but is not limited to, industrial fabrics such as belts or conveyors, and sleeves or cylindrical belts specifically used in nonwoven production.

A fabric structure can be used as the instant support member, belt or sleeve, to make a desired nonwoven product, the structure being permeable to air and water. The structure comprises a web contact surface having a pattern including a series of raised land areas and depressions adapted to impart a texture to the nonwoven product. The fabric structure may include a supporting substrate, which can be constructed from any one or more of textile materials—which includes any woven or nonwoven supporting substrate (i.e., base fabric)—such as woven yarns, nonwovens, yarn arrays, spiral links, knits, braids; spiral wound strips of any of above-listed forms, independent rings, and other extruded element forms. For example, the textile material can be made from polymers such as polyethylene terephthalate ("PET"), polyamide ("PA"), polyethylene ("PE"), polypropylene ("PP"), polyphenylene sulfide ("PPS"), polyether ether ketone ("PEEK"), polyethylene naphthalate ("PEN") metal, or a combination of polymers and metal.

Figure 4:
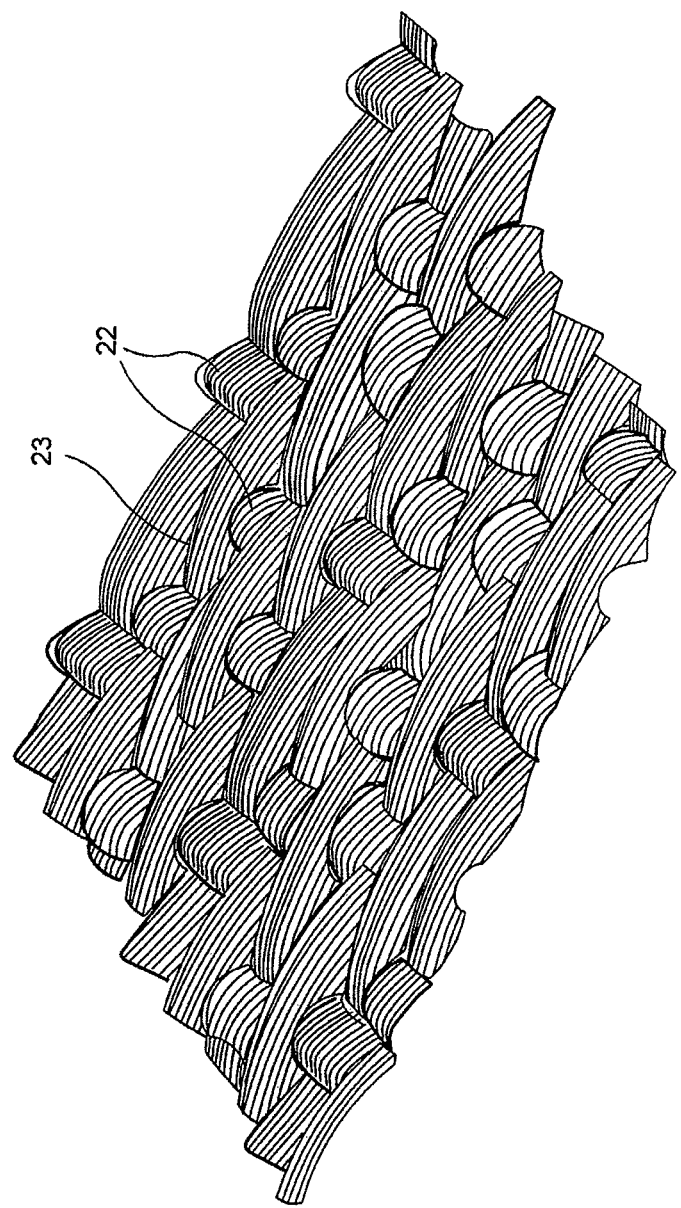
FIG. 4 is a diagram of a woven substrate showing the pattern of lands and depressions that are caused by the yarns as they are woven over and under each other.

In another example, FIG. 4 is a diagram of one embodiment of a woven substrate showing a pattern of lands 22 formed by MD yarns with depressions 23 formed therebetween with the lands resulting from the yarns as they are woven over and under each other. Such a substrate can take any number of woven forms, for example a long warp knuckle up weave or a long warp knuckle down weave. Examples of such weaves may be found in U.S. Pat. No. 6,769,535, the entirety of which is incorporated by reference hereby. The entire fabric structure or just the supporting substrate can also be adapted to include antistatic properties, as antistatic or static dissipative properties are factors in producing nonwoven products via "dry" process such as melt blowing.

Figure 5:
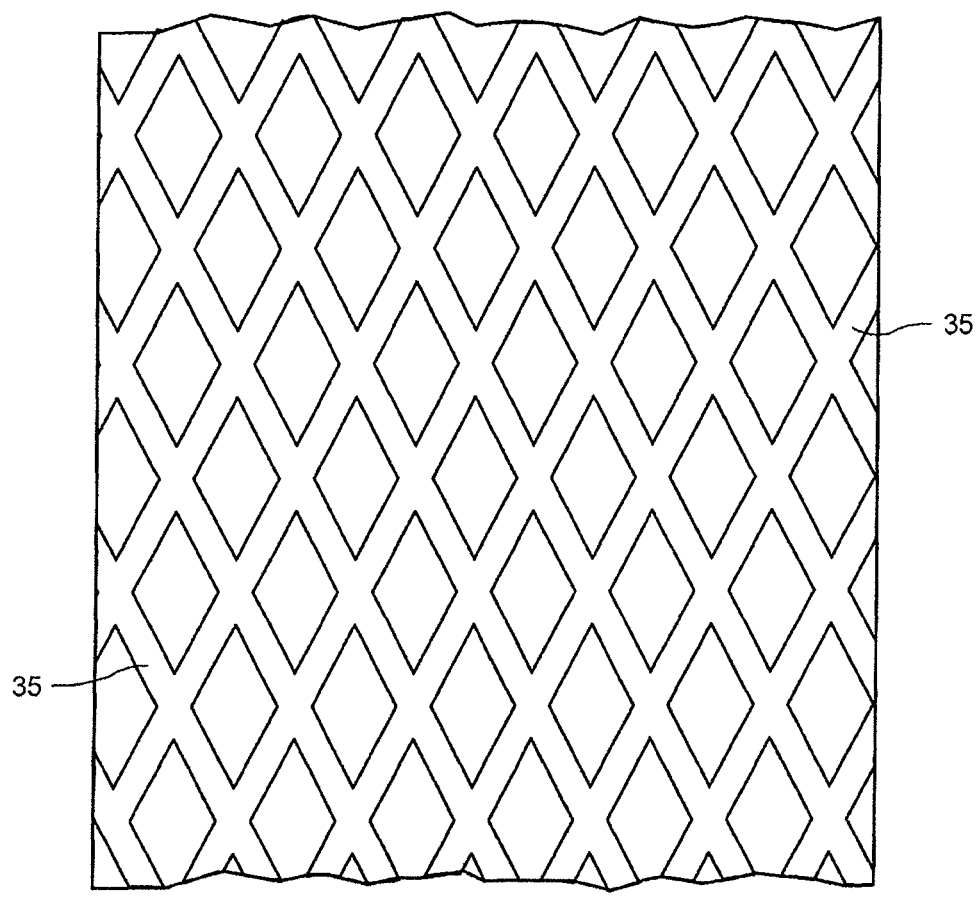
FIG. 5 is a diagram having a surface of the fabric structure wherein depressions have been graved into a film or coating of the fabric, sleeve or belt.

FIG. 5 illustrates another embodiment of a surface of the fabric structure with voids to be incorporated therein. As illustrated, the depressions are grooves 35 that have been graved into surface material such as a film or coating of a fabric, sleeve or belt. The surface material can be a coating formed from a liquid or a fused powder, a laminated film or a melted fiber, and can be formed by using, for example a liquid (aqueous or high solids), a coagulated material, a melted particulate polymer, or a foam. For example, a coating can be polyurethane, acrylic, silicone or a coating containing a fluorocarbon reinforced with polymeric or cellulosic fibers, or filled with inorganic particles of any size (e.g., nanometric particles). The particles can for example, be adapted to provide the fabric structure with improved web release, resistance to abrasion, or resistance to contamination.

The fabric structure is permeable to air and water, and includes a series of voids such as holes that are adapted to allow passage of water and/or air from the fabric surface into and through the structure, the voids being greater than 50 microns in effective diameter. Preferably holes are greater than 0.2 mm in effective diameter. While voids are discussed as holes, voids include any number of configurations, as discussed herein. The holes can be designed to allow water and/or air to pass through the surface and into and through the structure. The holes can be of the same size or of differing sizes. Also, the holes can be configured such that they are only in the depressions (see, for example FIG. 6). However, the fabric structure can be also designed such that holes are only in the land areas or such that the holes are in both the land areas and the depressions. In the case where the holes are in both the land areas and the depressions, the holes can be designed such that dimensions of the holes in the land areas are of different dimensions than the holes in the depressions. For example, the holes in the land areas can be larger than the holes in the depressions, or, the holes in the land areas can be smaller than the holes in the depressions. In another example, the hole dimensions can be such that the holes are smaller at the surface of the hole than the interior or the bottom of the hole. On the other hand, the hole dimensions can be larger at the surface of the hole than at the interior or bottom of the hole. The holes can also be cylindrical in shape. The fabric structure can be designed such that holes are in all of the land areas. The fabric structure can also be designed such that the holes are in all of the depression areas. Holes can be produced any number of ways, including mechanical punching or laser perforation. The fabric structure can also be designed such that the coating/film surface is flexible and compressible in the Z direction (i.e., through the thickness direction), but is also resilient.

In one embodiment, the fabric structure can include a surface pattern that comprises a compound texture. The compound texture can include a first texture formed by land areas and corresponding depressions formed in a surface material. The depressions can be formed by, for example, cutting, embossing, graving, or laser graving a surface material such as resin coating, a film, or a foam. A second texture can be formed by the textile material of the substrate and interstices of the textile material of the substrate. The textile material construction can be: woven yarns, a nonwoven, an MD yarn array, a CD yarn array, spiral links, independent rings, an extruded element, a knit, or a braid. For example, where the textile material is woven from yarns or is formed from interconnected spiral links, the second texture is formed by the yarns or spiral links and the interstices between the yarns or spiral links of the substrate. The surface material as described herein, includes a coating, a film, fused fiber, fused particles, or foam. The surface material can have sufficient pliability so that for example, if applied to a woven substrate it conforms to the shape thereof including the knuckles to create a textured surface. In the case of a film as a surface material when applied to a substrate, it may be sufficiently flexible (e.g. polyurethane film) that when heated it conforms to that of the substrate. For example, if the substrate is woven that the film would conform to the weave pattern, knuckles and all. If, however, the film was rigid (e.g. MYLAR®) it would not conform to the surface of the substrate but rather lay flat on any high points (e.g. knuckles in the case of a woven substrate) to create a planar surface which is subsequently texturized. In the fabric structure, the holes can be in the land areas only of one of the textures, or the holes can be in the land areas of both of the textures. Also, the holes can be in the depressions of only one texture or in the depressions of both of the textures. In yet another variation, the holes are can be in lands of one of the textures, and the depressions of the other texture.

Figure 6:
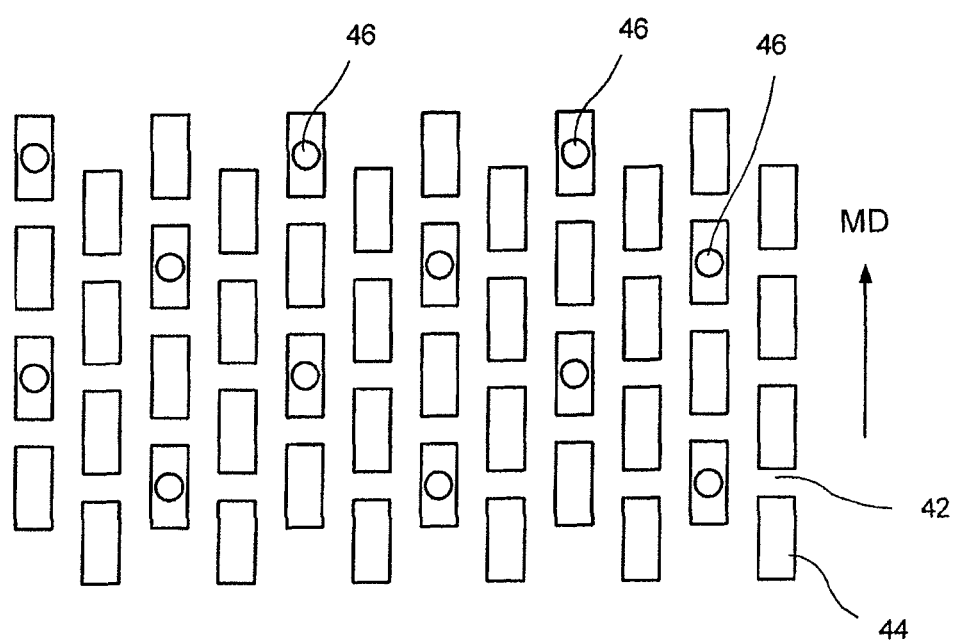
FIG. 6 is a diagram looking down on the surface of the structure, the surface of which is either a film or coating. The dark areas are graved depressions; light areas are raised land areas, and the circles represent through voids or holes.

FIG. 6 is a diagram looking down on the surface of the fabric structure, the surface of which can be either a film or coating. The dark areas are graved depressions 44 and the light areas are raised lands 42, and the circles represent voids or holes 46. In the diagram, the holes 46 are configured such that they are only in the depressions 44. As shown in the FIG. 6, a surface pattern can be uniform and repeatable. The land areas 42 of the surface pattern are continuous, although the pattern can be designed such that the land areas are discrete islands. The depressions 44 are shown as discrete depressions 44, however, the depressions can also be designed to be continuous. Depressions can be formed any number of ways, including embossing, cutting, graving, or laser graving. Note that while land areas and depressions are indicated thereon they obviously can be the reverse thereof with the land areas taking the shape of the depressions and vice versa in this and the other embodiments described herein. A sleeve can also be a partially or fully impregnated structure where the "impregnate" is not just a coating but partially or fully impregnates the through thickness of the base substrate.

The surface pattern shape of an island looking downward, be it a depression or a land area, can be any number of shapes, including round, oblong, square, rectangular, trapezoidal, pentagonal, hexagonal, diamond, frustoconical, triangular, or other polygons. The continuous land areas or depressions can be straight with respect to the machine direction ("MD"), straight with respect to the cross-machine direction ("CD"); at an angle to the MD or CD, or in two distinct sets at an angle to the MD or CD (for each set). The continuous land areas or continuous depressions can be curvilinear or straight. Moreover the continuous land areas or continuous depressions can be both curvilinear and straight on the same fabric structure and the continuous areas can have sections which are curvilinear and straight. The cross-sectional shapes of the land areas of the islands and continuous land areas may take on a multitude of shapes including polygonal or other shapes suitable for the purpose. Cross-sectional is meant to mean looking axially along the fabric. As shown in FIG. 6 the discrete depressions 44 and the continuous land areas 42 are straight with respect to the MD. While the depressions and land areas are shown rectangular in shape they may take on many shapes including that which would form a logo in the nonwoven product.

The surface of the structure can thus be made in any number of ways, including by directly molding it at the point of manufacture to create the structure, or at another point by, for example, later graving the web contact surface or side of the fabric structure (e.g., by laser); or by precision resin deposition as set forth in U.S. Pat. Nos. 7,005,044, 7,008,513, 7,014,735, 7,022,208, 7,144,479, 7,166,196, and 7,169,265; or by extrudate as disclosed in U.S. Pat. No. 6,358,594, the disclosures of which are all incorporated herein by reference. Where the fabric structure is used, for example, to manufacture tissue, towel or a nonwoven product, the patterns contemplated are such to optimize web bulk and texture verses machine runability.

Figure 7:
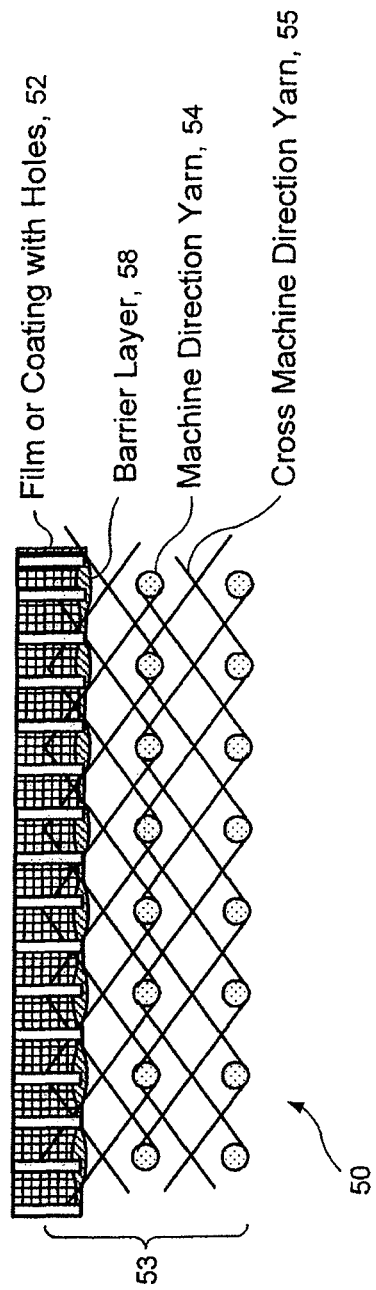
FIG. 7 is a cross section of an embodiment showing a multilayer woven substrate with a coating or a laminated film surface with a textured surface. The coating/film penetrates slightly into the woven structure which has a barrier layer. Through voids such as through holes are shown passing through the impermeable film/coating into the open weave structure allowing passage of air and/or water.

FIG. 7 is a cross section of an embodiment showing a multilayer woven substrate 53 with a surface material 52 such as a coating or a laminated film surface. The coating or film can be adapted to have sufficient rigidly to reside on the surface of knuckles included in the fabric structure. FIG. 7 shows a woven substrate 53 that includes MD yarns 54 and CD yarns 55, and does not include batt fiber needled into the base fabric. As shown in FIG. 7, the coating/film 52 penetrates slightly into the woven structure 53 which has a barrier layer 58. A sleeve can also be a partially or fully impregnated structure where the "impregnate" is not just a coating but partially or fully impregnates the through thickness of the base substrate. A surface material 52 such as a coating can also be porous or porous foam, and the fabric structure 50 can be designed not to be permeable to air or water except by the holes 56. Holes or voids 56 are shown passing through the impermeable film/coating 52 into the open weave structure 53 allowing passage of either or both of air and water.

The surface material could include a durable material with a high solids content, such as, for example, polyurethane, acrylic, silicone, or a coating containing a fluorocarbon each of which may be reinforced with polymeric or cellulosic fibers, or filled with inorganic particles of any size (e.g., nanometric particles). The particles can for example, be adapted to provide the fabric structure with improved web release, resistance to abrasion, or resistance to contamination. The resulting coated fabric thereby includes a solid coating on the surface. While the coating does not penetrate the supporting substrate, the composite structure is rendered impermeable. The coated fabric can then be sanded or surface enhanced to obtain a smooth surface. Holes can then be formed in the fabric structure, by, for example, laser punching to create the holes. The laser punching can be configured such that the holes only penetrate the coating, but do not penetrate the elements (e.g. yarns) of the support substrate. The surface can then be graved to give a desired texture and the resulting fabric structure is a textured coated fabric with through holes in the coating. The resulting fabric surface is thereby durable and permeable to both air and/or water.

Nonetheless, surface material can cover a support substrate of any textile material, which includes both woven and nonwoven base fabrics with a batt of fiber needled to the base structure. For example the fabric structure can include a layer of batt fiber under the coated surface of the fabric structure. The batt layer can be adapted to allow the surface material to penetrate into the batt layer and/or penetrate at least partially into the substrate.

Figure 8:
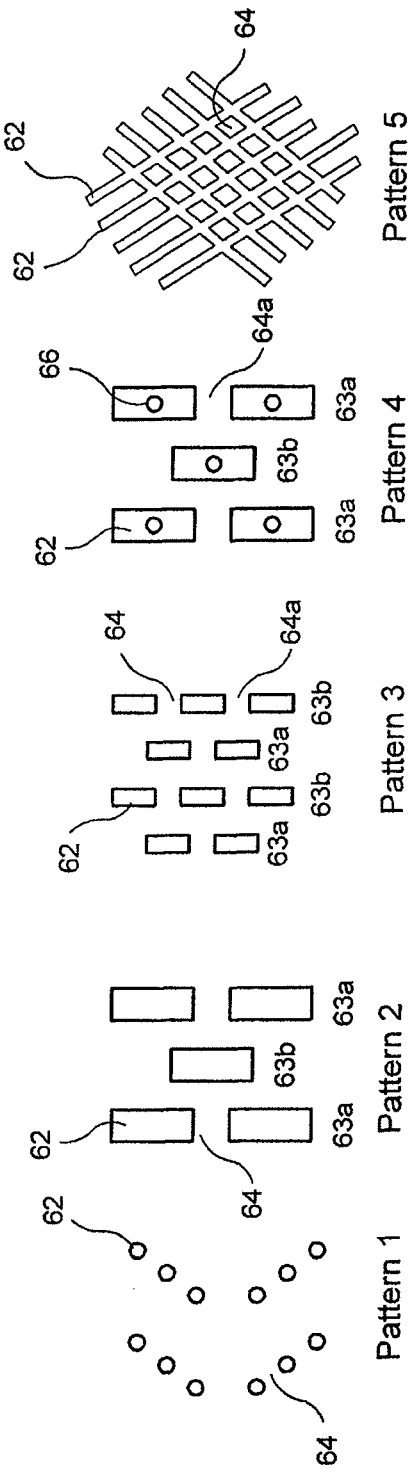
FIGS. 8A-8E are patterns of land areas and corresponding depressions formed by graving or cutting.

FIGS. 8A-8E are patterns of land areas and corresponding depressions formed by, for example, graving or cutting, where the shaded areas represent land areas 62. FIG. 8D shows a void or hole 66 in land areas. Surface patterns can be adapted to be uniform and repeatable, nonuniform and repeatable, as well as nonuniform and random. As explained above (i.e., with respect to FIG. 6) the land areas 62 of the surface pattern include discrete islands 62 or continuous areas (not shown), and the depressions 64 can include discrete islands (not shown) or continuous areas 64. The shape of the island can be round, oblong, square, rectangular, trapezoidal, pentagonal, hexagonal, diamond, frustoconical, triangular, or another polygonal shape. At FIG. 8A, the pattern has about 3 land areas 62 per $cm^2$. In FIGS. 8B and 8D, the pattern includes rectangular, discreet land areas 62 about 2.0 mm by 1.0 mm, and continuous depressions 64 that separate directional columns 63a, 63b of the discreet land areas 62 by about 1.0 mm. Alternate columns 63a of the land areas 62 are separated by depressions 64a of about 1.0 mm.

In FIG. 8C, the pattern includes rectangular, discreet land areas 62 about 0.5 mm by 1.0 mm, and continuous depressions 64a that separate directional columns 63a, 63b of the discreet land areas are about 0.5 mm. Alternate columns 63a of the land areas 62 are separated by depressions 64a of about 0.5 mm. FIG. 8E shows a pattern that includes a diagonally cross-hatched pattern of continuous land areas 62 and discreet, square or diamond shaped depressions 64, where the depressions and the land areas are each about 1 mm in width, and the discreet depressions 64 are about 1.0 $mm^2$.

Figure 9:
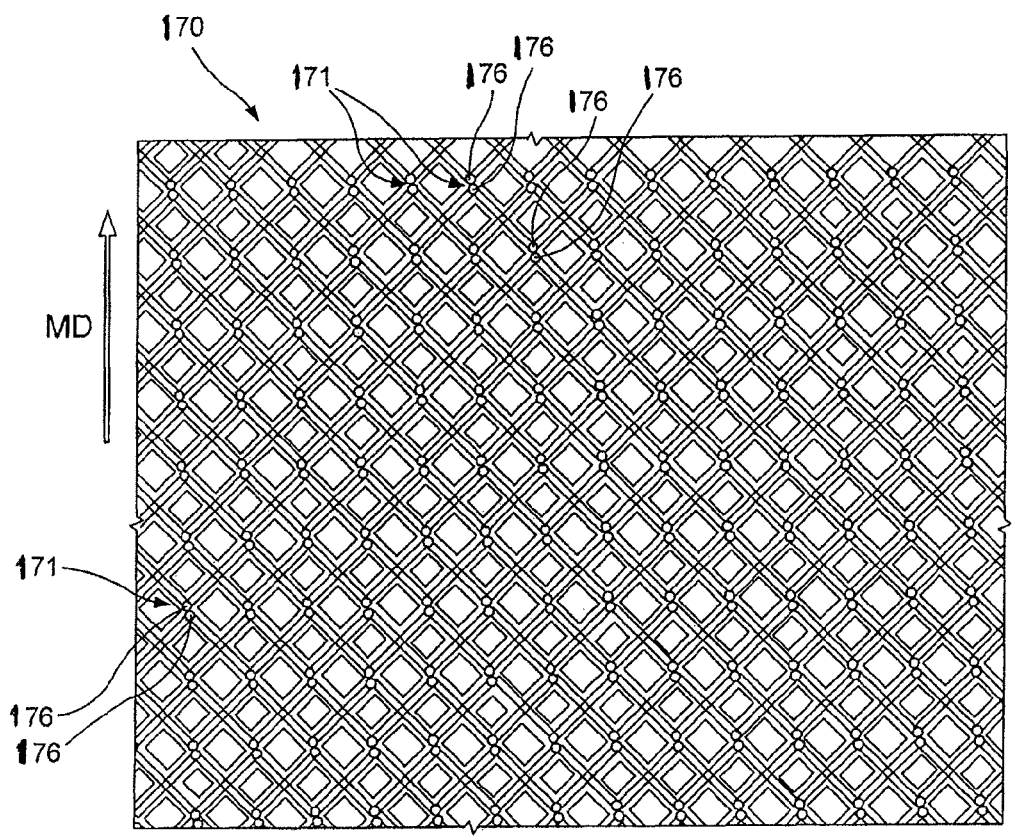
FIG. 9 is a diagram of a belt with a coating that has been graved in a criss/cross pattern. Pairs of voids are located in the recesses/depressions where they criss-cross at certain predetermined locations. In this manner, the voids are oriented along generally machine direction (MD) lines. The placement of the voids also contributes somewhat to the texture of the resultant nonwoven product by causing localized fiber reorientation as fluid (air or water or both) passes through the voids from the textured surface through the rest of the structure.

FIG. 9 is a diagram of a belt 170 with a coating that has been graved in a criss-cross pattern. As illustrated therein, pairs of voids 176 are located in the recesses 171 where they criss-cross at certain predetermined locations. In this manner, the voids 176 are oriented along generally MD lines. The placement of the voids 176 also contributes to the texture of the resultant nonwoven product by causing localized fiber reorientation as a fluid (air or water or both) passes through the void 176 from the textured surface through the rest of the structure.

Figure 10A:
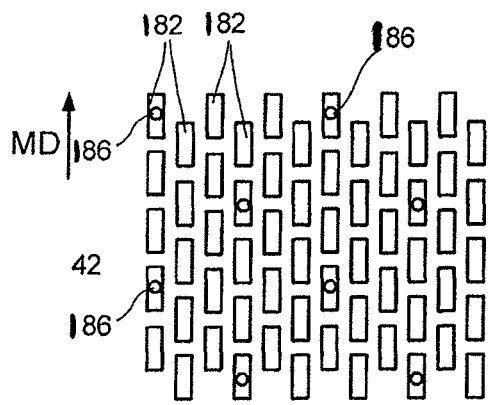
FIGS. 10A-C show different patterns of lands and depressions with through holes in a desired pattern through some of the lands.
Figure 10B:
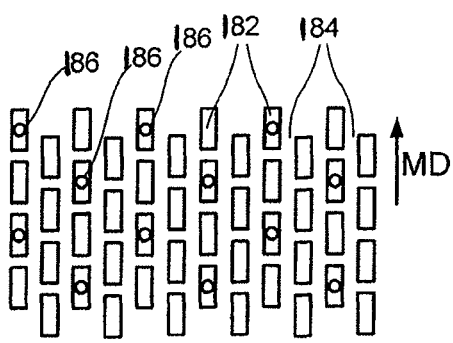
Figure 10C:
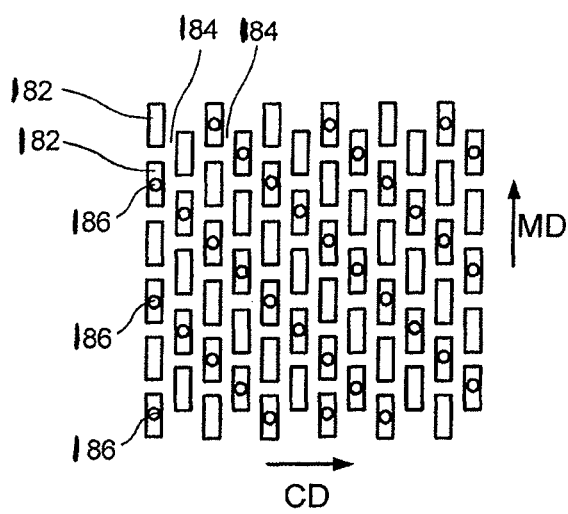

FIGS. 10A-C show different patterns of lands 182 and depressions 184 with through holes 186 in a desired pattern through some of the lands. The continuous lands 182 or the depressions 184 can be straight with respect to the MD, straight with respect to the CD; at an angle to the MD or CD, or in two distinct sets at an angle to the MD or CD. The angles of the two sets can be the same angles or at different angles. The continuous lands 182 or the depressions 184 can be curvilinear or straight. Also the continuous lands 182 or the depressions 184 can be both curvilinear and straight; or the continuous lands 182 or the depressions 184 can have sections which are curvilinear and straight. The depressions can be formed by any one of embossing, cutting, graving, or laser graving. As shown at FIG. 10A, the pattern has about 4 holes 186 per $cm^2$ at every third pattern in the CD and the MD, whereas at FIG. 10B the pattern has about 7 holes 186 per $cm^2$ at every second pattern in the CD and every second pattern in the MD, and FIG. 10C shows about 12 holes 186 per $cm^2$. In each of FIGS. 10A-C, the voids 186 are shown as in the land areas 182, which are discreet islands and rectangular.

In yet another embodiment, the fabric structure can include a fabric substrate coated with a resin or a porous foam; and the fabric substrate is formed from a textile material construction which can be any of a woven fabric of yarns, an MD yarn array; a CD yarn array; both an MD and CD yarn array, a spiral link base; a plurality of independent rings; an other extruded formed element; a knitted base; or a braided base. The land areas and depressions can be formed from the textile material making up the substrate and the interstices of the textile material. For example, the land areas and depressions can be formed from the yarns or interconnected spiral links making up the substrate and the interstices between the yarns or spiral links. The land areas can share a geometric characteristic. For example, land areas can be shaped substantially the same or different. Land areas can also be about the same height or different. The land areas can also differ in a geometric characteristic. This equally applies to the other embodiments set forth herein. Also, the holes can be configured such that they are only in the land areas and extend through the underlying textile material forming the land areas. The holes can also be designed such that they are only in the depressions (i.e., the interstices) between the land areas formed by the textile material. The holes can also be in both the land areas and depressions between the yarns or elements of the textile material.

As shown in FIGS. 11A-G, in yet another embodiment, the fabric structure can be used in a nonwoven manufacturing process. However, this embodiment has been found to be especially beneficial when used in the spunlacing nonwoven process. In such an embodiment the fabric structure can be adapted to form an air-permeable and water-permeable conveyor for use in the aforesaid application. The conveyor can be made from an extruded or laminated film 191 in which defined holes 196 are made in order to reach the desired air permeability. A support structure (not shown) can be attached to one or both sides of one or both films 191a, 191b. These holes 196 can have different diameters from about 0.2 mm up to about 5.0 mm, and the holes 196 can be constructed to be at different angles with respect to the plane of the conveyor surface. The shape of the holes 196 can be round, square, oval or any given shape, such as a star shape.

As shown in FIG. 11A the position of the holes 196 on the surface of the conveyor can be uniformly or randomly distributed. The holes 196 can also be distributed such that that have a specific density in a given area of the conveyor or distributed uniformly over the entire surface, depending on, for example, the requirements of the nonwoven product being produced. The voids 196 can also take the form of lines, which are cut or graved into the conveyor to, for example, create logos. The conveyor can be produced with a layer or a plurality of layers of polymer films 191a, 191b, with or without fiber reinforcement (woven or not). The fabric structure can also be made as a sandwich component with woven or nonwoven layer laminated between a plurality of polymer films as can be the case with any of the substrates already described herein. This reinforcement can increase the mechanical stability of the fabric structure.

The surface of the conveyor can be graved in order to create topography such as a honeycomb or other pattern, or can be further treated for a specific application such as static dissipation, or anti-contamination. The surface of the conveyor can also be grooved to create topography for different patterning applications. The fabric structure can also be made as a sleeve to be installed on a drum (a shrinkable sleeve) or as an endless or seamable fabric structure.

Figure 11F:
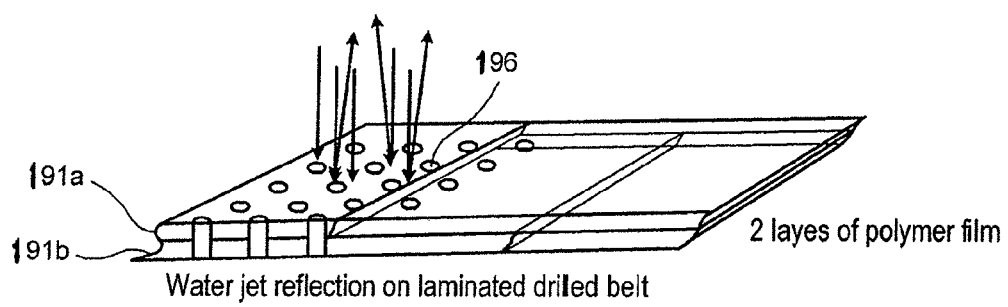

As shown at FIG. 11F the use of this type of conveyor allows for a better reflection of energy when used on a water jet process (hydroentangling) as compared to a standard woven belt. The structure results in, for example, improved entangling of fibers as well as preventing the penetration of fibers that are caught in the interstices or yarn crossovers of the woven structure. The result of this better fiber entanglement and reduced fiber picking is, for example, better nonwoven product release or transfer from this conveyor belt to the next position in the process.

Figure 11G:
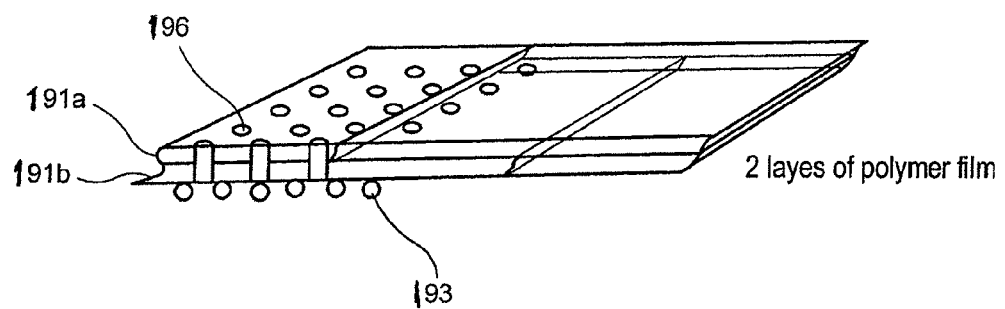

As shown in FIG. 11G, the machine side of the fabric structure can also be made with a surface topography, grooves, or added monofilament 193 in order to create higher drainage in the case of a wet process; or to create an aerodynamic effect in the case of a dry process.

The substrate itself, if present, can also have antistatic or static dissipative properties as well.

Figure 12A:
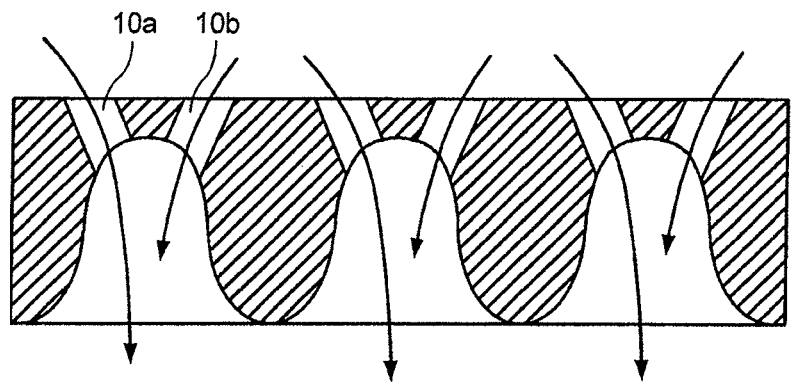
FIGS. 12A-12C show a fabric structure with a branched void structure.
Figure 12B:
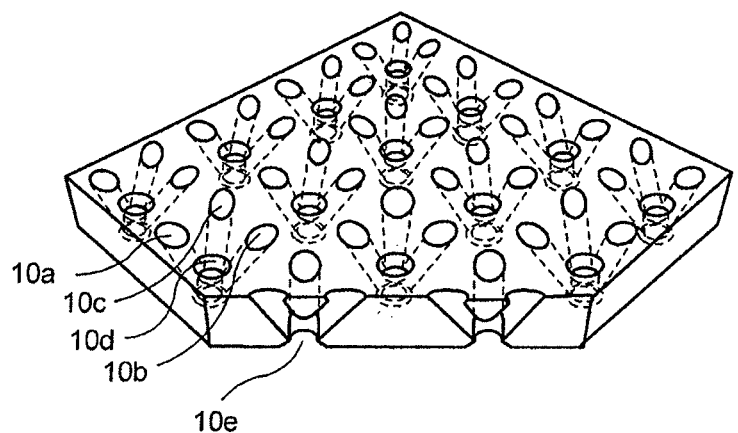
Figure 12C:
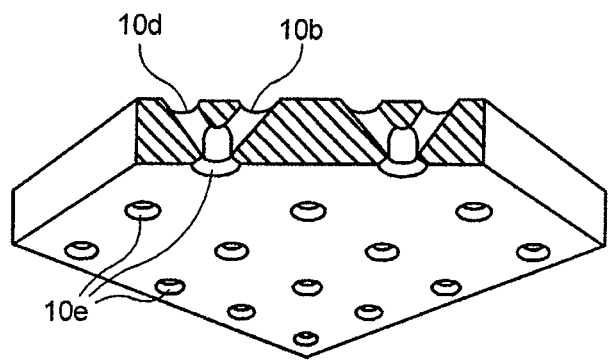

In another embodiment disclosed is a fabric structure that may or may not have a base support substrate and comprises a web contact surface having a series of land areas and depressions and a branched void structure adapted to impart texture to a nonwoven product. The land areas and depressions can be formed in accord with the methods and structures disclosed throughout herein. FIGS. 12A-12C show the surface and cross-section of the surface of a fabric structure 10 with a branched void or opening which comprises a plurality of small holes 10a, 10b, 10c, 10d on the web contact side 12 inclined such that they merge into a larger void 10e at an opposing side 14 of the surface. The voids can be straight (cylindrical) or conical. For instance, conical holes of different patterns could be designed such that they are larger and well distributed over one side such as a web contact surface, whereas the voids on the opposing machine side surface could be substantially aligned along the MD, thereby providing, for example, increased drainage.

This branched void can be formed in a structure as shown or in a laminated substrate. The voids can be created by any number of perforation methods or combination thereof, including laser drilling, mechanical punching, and embossing (e.g. thermal or ultrasonic). For example, the voids could be created by combining laser drilling with embossing. As shown in FIG. 12C, four first side voids 10a, 10b, 10c, 10d merge into one second side void 10e, however, any number and combination of branched voids is contemplated for either side of the fabric structure.

Figure 13:
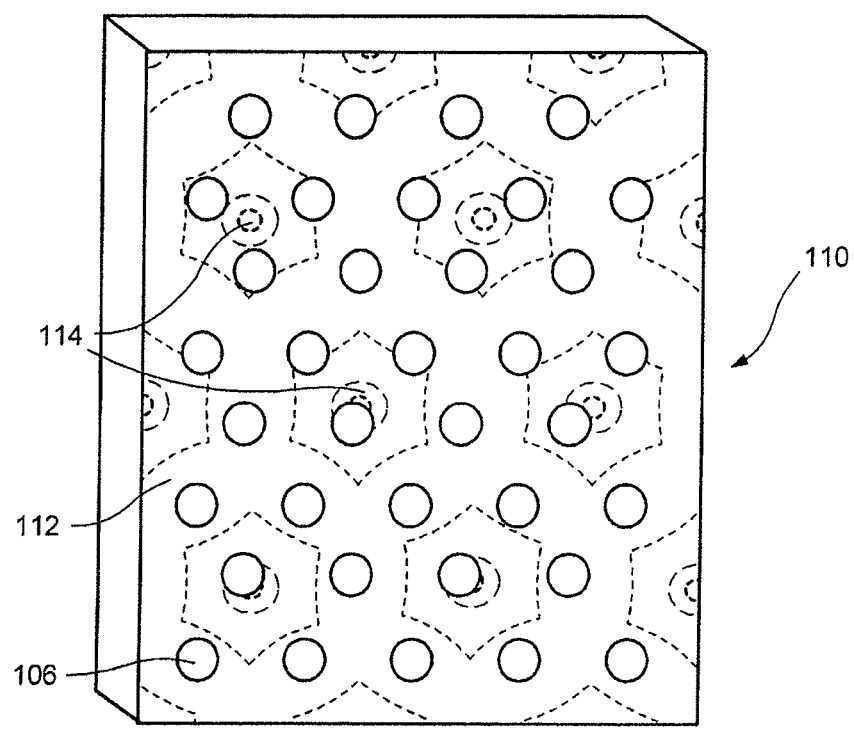
FIG. 13 shows a top or paper side view of fabric structure comprising a permeable polymeric film that includes a defined pocket pattern of a predetermined depth and shape.

In another embodiment, disclosed is a fabric structure comprising a web contact surface having a pattern including land areas and depressions adapted to impart texture to a nonwoven product. FIG. 13 shows a top or web contact side view of fabric structure's surface 110 comprising a permeable polymeric film or coating that includes a defined pocket pattern of a predetermined depth and shape. The pocket pattern can be laser etched, scored, graved, or embossed into the surface. The fabric structure has continuous land areas 112 and discrete depressions 114, whereby increasing depth is shown by darker shading. The land areas 112 form a hexagonal matrix or lattice in a higher plane than the darker shaded depressions 114. Depressions 114 can be formed into the surface of the fabric structure such that it takes a predetermined shape, shown as hexagon 114. The depth of the pockets 114 increases as the shading darkens. Voids 106 are distributed over the surface, rendering the fabric structure permeable. The structure can also include a woven substrate that can act as a support structure to the fabric structure, as discussed in the above embodiments.

Texturing the surface along with laser drilling holes creates a surface that has a pocket volume of various shapes. The pockets could thereby, for example, when used in the web pick-up section of the spunlace machine, provide a surface such that when forming or transferring a web on the surface, the web would take the form of a mirror image of the patterned fabric structure, thereby generating bulk in the resultant nonwoven product formed from the fibrous web.

The pockets 114 can form any predetermined pattern. The pockets 114 can also take any shape, such as, for example, diamond shapes, random shapes, butterflies, cat paws, other animals, logos, etc. Depressions 114 can be of any predetermined depth as well. The pockets 114 can provide an area for the fiberous mat to conform, thus generating an additional Z directional thickness (bulk) in the nonwoven product produced on the fabric structure 110, as well as a distinctive pattern. "Structure" pertains to variations in the basis weight and/or the density of the nonwoven product which are greater than occur in ordinary nonwoven production and due to ordinary variations, such as those induced by creping. "Structure" may also, however, refer to a texture or a pattern in the nonwoven product. Such "structured" nonwoven products are usually soft and bulky with high absorbency. Belts or sleeves of the present invention comprise a surface patterning framework and may have a reinforcing structure. Structured nonwoven product produced thereon can be softer, more absorbent, and be of a low basis weight.

Note as to all of the aforementioned embodiments, while it contemplated that texturing would be throughout the fabric surface, depending upon the application, texturing may occur over only a portion or portions of the fabric surface.

Modifications to the above would be obvious to those of ordinary skill in the art, but would not bring the invention so modified beyond the scope of the appended claims.

The invention claimed is:

1. A fabric structure for use as a belt or sleeve used to make textured nonwoven products, the structure being permeable to air and/or water, comprising:
    a web contact surface having a pattern including a series of raised land areas and depressions adapted to impart a texture to the nonwoven product, and
    a series of voids adapted to allow passage of water and/or air from the fabric surface into and/or through the structure, the voids being greater than 50 microns in effective diameter,
    wherein the surface and compressible in the Z direction, and is adapted to be resilient.

2. The fabric structure of claim 1, wherein the voids are only in the land areas.

3. The fabric structure of claim 1, wherein the voids are only in the depressions.

4. The fabric structure of claim 1, wherein the voids are in both the land areas and the depressions.

5. The fabric structure of claim 1, wherein the voids in the land areas are different dimensions then the voids in the depressions.

6. The fabric structure of claim 1, wherein the voids in the land areas are larger than the voids in the depressions.

7. The fabric structure of claim 1, wherein the voids in the land areas are smaller than the voids in the depressions.

8. The fabric structure of claim 1, wherein the voids are the same size.

9. The fabric structure of claim 1, wherein the void dimensions are smaller at a surface of the void than an interior or a bottom of the void.

10. The fabric structure of claim 1, wherein the dimensions are larger at a surface of void than an interior or a bottom of the void.

11. The fabric structure of claim 1, wherein the voids are cylindrical in shape.

12. The fabric structure of claim 1, wherein the voids are produced in some manner, including mechanical punching, or laser perforation.

13. The fabric structure of claim 1 wherein the surface patterns are adapted to be uniform and repeatable.

14. The fabric structure of claim 1 wherein the surface patterns are adapted to be nonuniform and repeatable.

15. The fabric structure of claim 1 wherein the surface patterns are adapted to be nonuniform and random.

16. The fabric structure of claim 1 wherein the land areas of the surface pattern include discrete islands or continuous areas.

17. The fabric structure of claim 1 wherein the surface pattern includes discrete depressions or continuous areas.

18. The fabric structure of claim 16 wherein a shape of the island or discrete depressions is selected from the group consisting essentially of: round, oblong, square, rectangular, trapezoidal, pentagonal hexagonal, diamond, frustoconical, triangular, and polygonal.

19. The fabric structure of claim 16 wherein a cross-sectional shape of the islands or continuous areas are a polygonal shape.

20. The fabric structure of claim 16 wherein the continuous lands or the depressions can be straight with respect the machine direction ("MD"), straight with respect to the cross-machine direction ("CD"); at an angle to the MD or CD, or in two distinct sets at an angle to the MD or CD.

21. The fabric structure of claim 20 wherein the angles of the two sets are the same or different.

22. The fabric structure of claim 16 wherein the continuous lands or depressions are curvilinear or straight.

23. The fabric structure of claim 16 wherein the continuous lands or the depressions are both curvilinear and straight; or the continuous lands or the depressions have sections which are curvilinear and straight.

24. The fabric structure of claim 1 wherein the depressions are formed by a method selected from the group of methods consisting essentially of embossing, cutting, graving, and laser graving.

25. The fabric structure of claim 1 wherein the land areas share a geometric characteristic.

26. The fabric structure of claim 1 wherein the land areas differ in a geometric characteristic.

27. The fabric structure of claim 1 wherein the fabric structure is adapted to include antistatic properties.

28. The fabric structure of claim 1 wherein the fabric structure is selected from the group of fabrics used in a machine to impart texture to a nonwoven product.

29. The fabric structure of claim 1 wherein the voids are in all of the land areas.

30. The fabric structure of claim 1 wherein the voids are in all of the depression areas.

31. The fabric structure of claim 1 wherein a plurality of voids on a surface of said fabric structure merge into a void on an opposing surface of said fabric structure.

32. The fabric structure of claim 17 wherein a shape of the island or discrete depressions is selected from the group consisting essentially of: round, oblong, square, rectangular, trapezoidal, pentagonal hexagonal, diamond, frustoconical, triangular, and polygonal.

33. The fabric structure of claim 17 wherein the continuous lands or the depressions can be straight with respect the machine direction ("MD"), straight with respect to the cross-machine direction ("CD"); at an angle to the MD or CD, or in two distinct sets at an angle to the MD or CD.

34. The fabric structure of claim 17 wherein the continuous lands or depressions are curvilinear or straight.

35. The fabric structure of claim 17 wherein the continuous lands or the depressions are both curvilinear and straight; or the continuous lands or the depressions have sections which are curvilinear and straight.

36. The fabric structure of claim 1, the material being selected from the group of: a coating, a laminated film, a melt fiber or foam.

37. The fabric structure of claim 36, wherein the coating is selected from the group consisting essentially of: acrylic, silicone, a coating containing a fluorocarbon, polyurethane, each of which may be reinforced with polymeric or cellulosic fibers, or filled with inorganic particles, wherein the particles are adapted to provide the structure with improved web release, resistance to abrasion, or resistance to contamination.

38. The fabric structure of claim 37 wherein the coating is adapted to be porous or is a porous foam, and the fabric structure is not permeable to air or water except by the voids.

39. The fabric structure of claim 36 wherein the fabric structure further comprises:

a layer of batt fiber under the surface of the fabric structure, wherein the batt layer is adapted to allow the surface material to penetrate into batt layer and/or penetrates at least partially into the substrate.

40. The fabric structure of claim 36 wherein the fabric structure further comprises:
a barrier layer adapted to control a depth of surface material penetration.

41. The fabric structure of claim 36 wherein the surface material is a coating and includes a formation material selected the group consisting essentially of: a liquid (aqueous or high solids), a coagulated material, a melted particulate polymer, or a foam.

42. The fabric structure of claim 1, wherein the structure has a supporting substrate, and the substrate can be constructed from a textile material selected from the group consisting essentially of: woven yarns; a nonwoven, a yarn array, a spiral link, a knit, a braid; a spiral wound strip, a series of independent rings, and an extruded element forms, or any combination of one or more of the listed forms.

43. The fabric structure of claim 42, wherein the composition of the textile material is selected from the group of a polymer and a metal; and
where the polymer is selected from the group consisting essentially of PET, PA, PE, PP, PPS, PEEK and PEN.

44. The fabric structure of claim 42 which further includes a surface material selected from the group of a coating, a laminated film, a melt fiber or foam and is adapted to have sufficient pliability to conform to the substrate of the fabric structure.

45. The fabric structure of claim 43 wherein the surface pattern comprises a compound texture including:
a first texture having land areas and depressions, and
a second texture different from the first texture formed by a textile material of the substrate.

46. The fabric structure as in claim 45 wherein the textile material is selected from the group consisting essentially of: a woven yarns, a nonwoven, an MD yarn array, a CD yarn array, spiral links, independent rings, an extruded element, a knit, or a braid.

47. The fabric structure of claim 45 wherein the voids are in the land areas of only one of the textures.

48. The fabric structure as taught in claim 45 wherein the voids are in the land areas of both of the textures.

49. The fabric structure as taught of claim 45 wherein the voids are in the depressions of only one texture.

50. The fabric structure of claim 45 wherein the voids are in the depressions of both of the textures.

51. The fabric structure of claim 1, wherein a support substrate is coated with a resin or a porous foam or has a film attached thereto; and
the fabric substrate is formed from a textile material construction selected from the group consisting essentially of:
a woven fabric,
an MD yarn array;
a CD yarn array;
a spiral link base;
a plurality of independent rings;
an extruded element;
a knitted base; and
a braided base,
wherein the land areas and depressions are formed from the textile material making up the substrate.

52. The fabric structure of claim 1, wherein the fabric structure comprises a woven substrate having a long warp knuckle up weave.

53. The fabric structure of claim 1 wherein the fabric structure comprises a woven substrate having a long warp knuckle down weave.

54. The fabric structure of claim 1, wherein the land areas are continuous and form a lattice pattern.

55. The fabric structure of claim 54 wherein the depressions are adapted to be at a predetermined depth and shape.

56. The fabric structure of claim 1 wherein a plurality of voids on a surface of said fabric structure merge into a void on an opposing surface of said fabric structure.

57. The fabric structure of claim 56 wherein a diameter of the voids is smaller than the thickness of the substrate.

58. The fabric structure of claim 1 wherein the land areas depressions are continuous and form a lattice pattern.

59. The fabric structure of claim 58 wherein the depressions are adapted to be at a predetermined depth and shape.

60. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter wherein the surface comprises a surface material,
the material being selected from the group of: a coating, a laminated film, a melt fiber or foam.

61. The fabric structure of claim 60, wherein the coating is selected from the group consisting essentially of: acrylic, silicone, a coating containing a fluorocarbon, polyurethane, each of which may be reinforced with polymeric or cellulosic fibers, or filled with inorganic particles, wherein the particles are adapted to provide the structure with improved web release, resistance to abrasion, or resistance to contamination.

62. The fabric structure of claim 61 wherein the coating is adapted to be porous or is a porous foam, and the fabric structure is not permeable to air or water except by the voids.

63. The fabric structure of claim 60, wherein the surface material is a film adapted to have sufficient rigidity so as to create a planar surface on the fabric structure.

64. The fabric structure of claim 60 wherein the fabric structure further comprises:
a layer of batt fiber under the surface of the fabric structure, wherein the batt layer is adapted to allow the surface material to penetrate into batt layer and/or penetrates at least partially into the substrate.

65. The fabric structure of claim 60 wherein the fabric structure further comprises:
a barrier layer adapted to control a depth of surface material penetration.

66. The fabric structure of claim 60 wherein the surface material is a coating and includes a formation material selected the group consisting essentially of: a liquid (aqueous or high solids), a coagulated material, a melted particulate polymer, or a foam.

67. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter, wherein the structure has a supporting substrate, and the substrate can be constructed from a textile material selected from the group consisting essentially of: woven yarns; a nonwoven, a yarn array, a spiral link, a knit, a braid; a spiral wound strip, a series of independent rings, and an extruded element forms, or any combination of one or more of the listed forms.

68. The fabric structure of claim 67, wherein the composition of the textile material is selected from the group of a polymer and a metal; and
where the polymer is selected from the group consisting essentially of PET, PA, PE, PP, PPS, PEEK and PEN.

69. The fabric structure of claim 67 which further includes a surface material selected from the group of: a coating, a laminated film, a melt fiber or foam and is adapted to have sufficient pliability to conform to the substrate of the fabric structure.

70. The fabric structure of claim 67 wherein the surface pattern comprises a compound texture including:
a first texture having land areas and depressions, and
a second texture different from the first texture formed by a textile material of the substrate.

71. The fabric structure as in claim 70 wherein the textile material is selected from the group consisting essentially of: a woven yarns, a nonwoven, an MD yarn array, a CD yarn array, spiral links, independent rings, an extruded element, a knit, or a braid.

72. The fabric structure of claim 70 wherein the voids are in the land areas of only one of the textures.

73. The fabric structure as taught in claim 70 wherein the voids are in the land areas of both of the textures.

74. The fabric structure as taught of claim 70 wherein the voids are in the depressions of only one texture.

75. The fabric structure of claim 70 wherein the voids are in the depressions of both of the textures.

76. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter,
wherein a support substrate is coated with a resin or a porous foam or has a film attached thereto; and
the fabric substrate is formed from a textile material construction selected from the group consisting essentially of:
a woven fabric,
an MD yarn array;
a CD yarn array;
a spiral link base;
a plurality of independent rings;
an extruded element;
a knitted base; and
a braided base,
wherein the land areas and depressions are formed from the textile material making up the substrate.

77. The fabric structure of claim 76 wherein the voids are only in the land areas and extend through the underlying textile material forming the land area.

78. The fabric structure of claim 76 wherein the voids are only in the depressions between the land areas formed by the textile material.

79. The fabric structure of claim 76 wherein the voids are in both the land areas and depressions between the textile material.

80. The fabric structure of claim 79 wherein the voids are in lands of the one of the textures, and the depressions of the other texture.

81. The fabric structure of claim 80 wherein the land areas are shaped substantially the same or different.

82. The fabric structure of claim 80 wherein the land areas are the same or different heights.

83. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter,
wherein the fabric structure comprises a woven substrate having a long warp knuckle up weave.

84. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter,
wherein the fabric structure comprises a woven substrate having a long warp knuckle down weave.

85. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter,
wherein the land areas are continuous and form a lattice pattern.

86. The fabric structure of claim 85 wherein the depressions are adapted to be at a predetermined depth and shape.

87. A fabric structure for use as a belt or sleeve used to make textured nonwoven products, the structure being permeable to air and/or water, comprising:
a web contact surface having a pattern including a series of raised land areas and depressions adapted to impart a texture to the nonwoven product, and
a series of voids adapted to allow passage of water and/or air from the fabric surface into and/or through the structure, the voids being greater than 50 microns in effective diameter,
wherein a plurality of voids on a surface of said fabric structure merge into a void on an opposing surface of said fabric structure.

88. The fabric structure of claim 87 wherein a diameter of the voids is smaller than the thickness of the substrate.

89. A fabric structure for use as a belt or sleeve used to make textured nonwoven products, the structure being permeable to air and/or water, comprising:

a web contact surface having a pattern including a series of raised land areas and depressions adapted to impart a texture to the nonwoven product, and a series of voids adapted to allow passage of water and/or air from the fabric surface into and/or through the structure, the voids being greater than 50 microns in effective diameter, wherein the depressions are continuous and form a lattice pattern.

90. The fabric structure of claim 89 wherein the depressions are adapted to be at a predetermined depth and shape.

* * * * *